Figure 5:
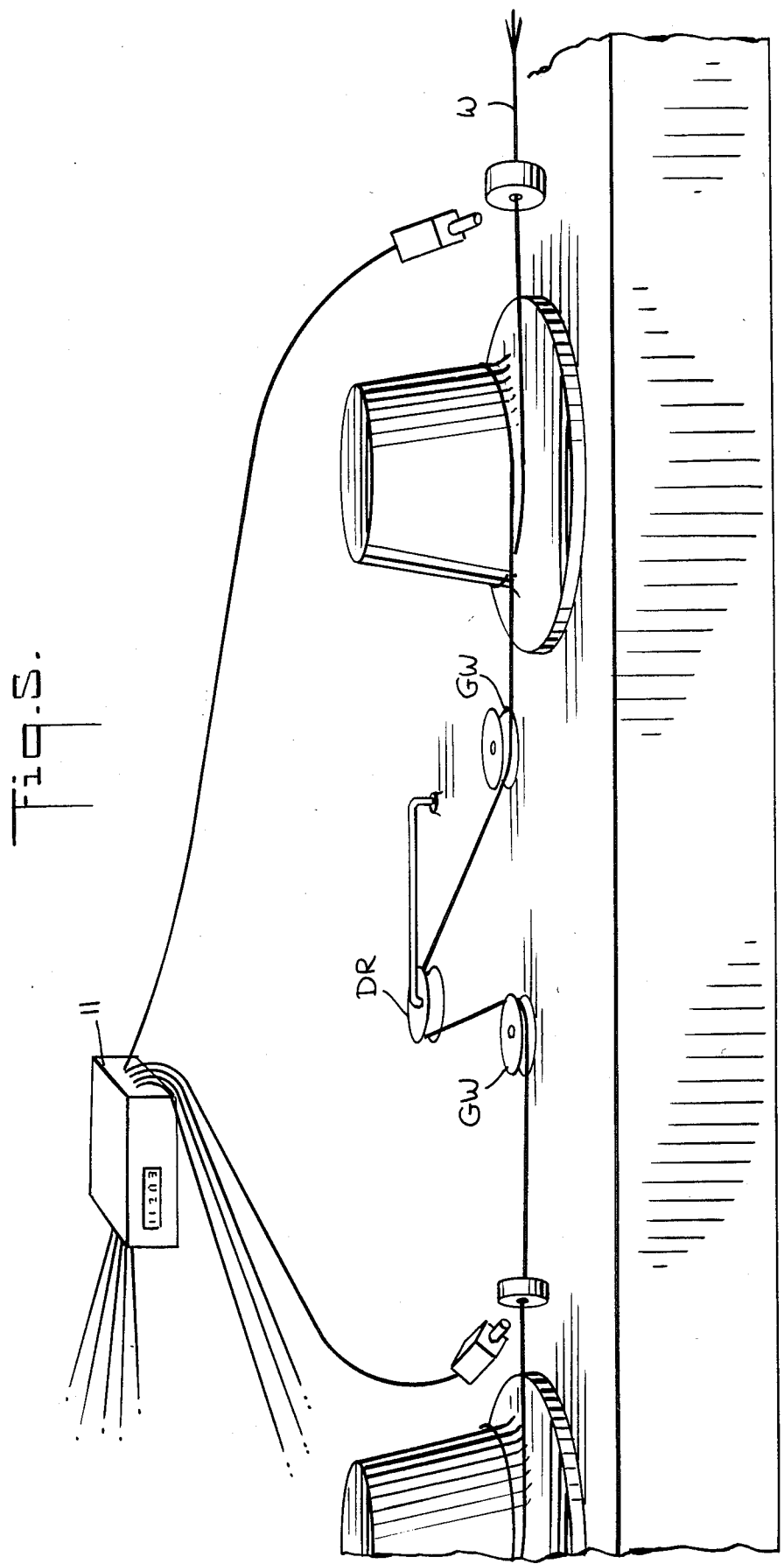

United States Patent [19]

Hagglund

[11] Patent Number: 4,573,336
[45] Date of Patent: Mar. 4, 1986

[54] METHOD AND APPARATUS FOR WIRE DRAWING

[76] Inventor: Erik Hagglund, 1277 Smith Ridge Rd., New Canaan, Conn. 06840

[21] Appl. No.: 615,344

[22] Filed: May 30, 1984

[51] Int. Cl.[4] ............................. B21C 1/04; G01L 5/04
[52] U.S. Cl. ............................................ 72/278; 72/13; 73/160; 374/165; 374/179
[58] Field of Search ............... 72/13, 286, 278, 286, 72/282, 283; 73/160; 374/121, 141, 165, 179

[56] References Cited

U.S. PATENT DOCUMENTS 3,812,702  5/1974  Benteler et al. ..................... 72/282
3,856,057 12/1974  Mitts et al. ......................... 72/13
4,414,833 11/1983  Nicolas et al. ...................... 72/13

Primary Examiner—W. D. Bray
Attorney, Agent, or Firm—Kenyon & Kenyon

[57] ABSTRACT

For continuously drawing wire the temperature of the wire at each die is measured and the drawing speed is adjusted so the hottest running one of the dies is just below an overheated temperature.

9 Claims, 6 Drawing Figures

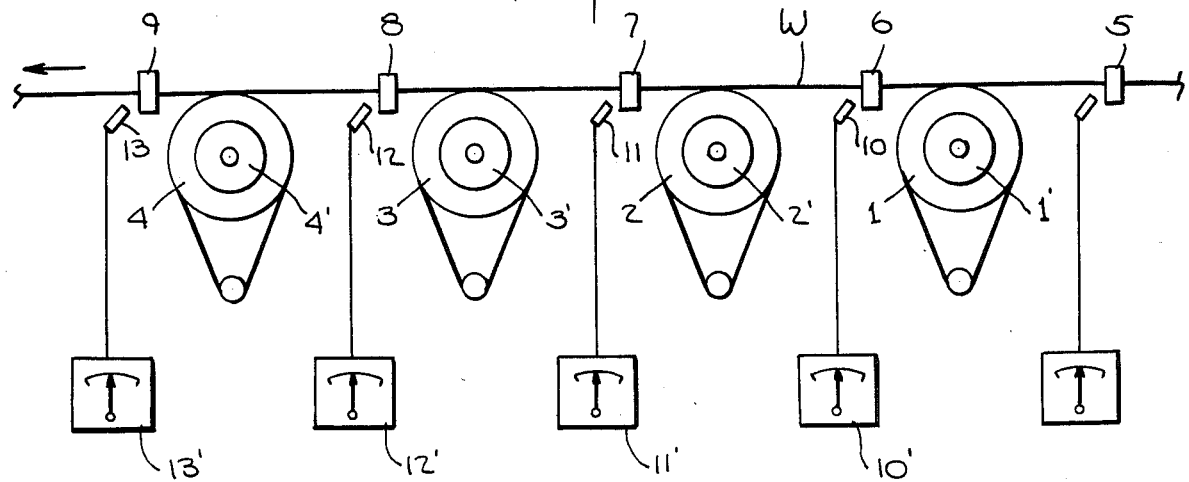
Fig.1.
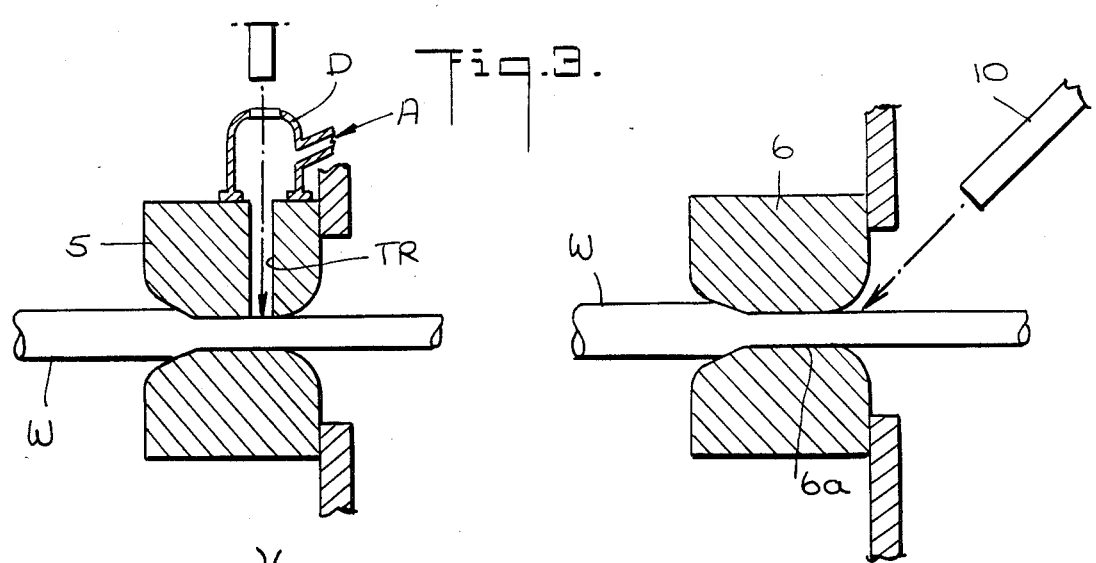
Fig.3.
Fig.2.
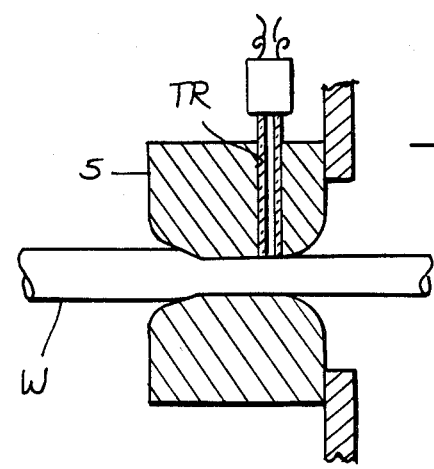
Fig.4.

METHOD AND APPARATUS FOR WIRE DRAWING

Wire is reduced in diameter by being drawn through a wire-drawing die having a die hole having various zones one of which is the bearing zone where the wire is ultimately reduced to the smaller diameter.

The wire is lubricated with a wire-drawing lubricant prior to drawing, so as to prolong the life of the die and prevent scratching and galling of the wire. Depending largely on the wire drawing speed, friction and the plastic working of the wire can cause the wire to reach an overheated temperature in the bearing zone of the die, so as to cause the lubricant to lose its lubricating value, consequently resulting in damage to the wire or die. Even when the temperature of the wire being drawn through the die is not high enough to cause lubrication problems, it may be high enough to cause embrittlement of the wire or unwanted physical properties in the case of certain alloys, and it is desirable to avoid an overheated temperature in this sense.

Academically, if a single die only were to be used the temperature the wire reaches in the bearing zone of the die hole could be measured and the wire drawing speed adjusted to the maximum that just avoids the overheated temperature.

However, in the continuous drawing of wire the wire is drawn continuously through a succession of wire drawing dies having successively smaller bearing zones in any one of which the overheated temperature can occur. Many variables account for the heating of the wire in the bearing zones of the successive dies and the temperature of the wire being drawn through the dies can vary appreciably from one die to another. Consequently, in order to avoid excessive wear of the dies and scrap wire loss, under commercial conditions wire is continuously drawn at a specified drawing speed lower than the maximum previously referred to in the case of a single die, and sometimes at considerably lower speeds. The "specified drawing speed" is related to alloy, diameter, machine type, etc. Therefore, a certain alloy of a certain size is always drawn at the same specified speed in a certain machine. Wire-drawing machines and their dies are expensive and to avoid interrupted production due to die replacements and wire rethreading, wire-drawing speeds are kept undesirably low from the viewpoint of production costs.

The object of the present invention is to continuously draw wire under commercial conditions at wire-drawing speeds higher than have heretofore been considered to be practicable and at speeds that might vary for the same wire alloy, wire size and wire drawing machine, the drawing speed used depending only on the conditions of actual dies, lubricants, alloy quality, etc.

Briefly summarized, the invention comprises drawing the lubricated wire continuously though the succession of wire drawing dies having successively smaller bearing zones and at each die individually measuring the wire temperature of the wire as close as possible to the die's bearing zone. The wire temperature measured inherently varies from die to die throughout the succession of dies of which there may be a large number. However, with the knowledge of the wire temperature in each die it becomes possible to adjust the drawing speed of the wire so that the highest temperature measured at any one of the dies is just below the overheated temperature that would cause trouble. Although the other dies may run cooler, wire drawing can not be faster without damage to the wire and dies.

To practice the above the continuous wire-drawing machine can have a temperature sensor, preferably of the non-contact type, installed at each die. Each sensor can be provided with an individual read-out means such as a meter, the meters being visually observed and the drawing speed adjusted manually, depending on the highest meter reading seen. Preferably the sensor outputs are fed to a computer capable of picking the highest temperature reading from the information obtained from the various sensors and comparing it with a known maximum permissible temperature so as to provide an output controlling the wire-drawing speed. Wire-drawing machines for this purpose are conventionally provided with the variable speed electric motor drives. Information as to the known maximum permissible drawing speed can be obtained by drawing a sample of the wire through a single die at varying speeds, the information obtained then being fed into the computer for that alloy and finishing size.

Figure 6:
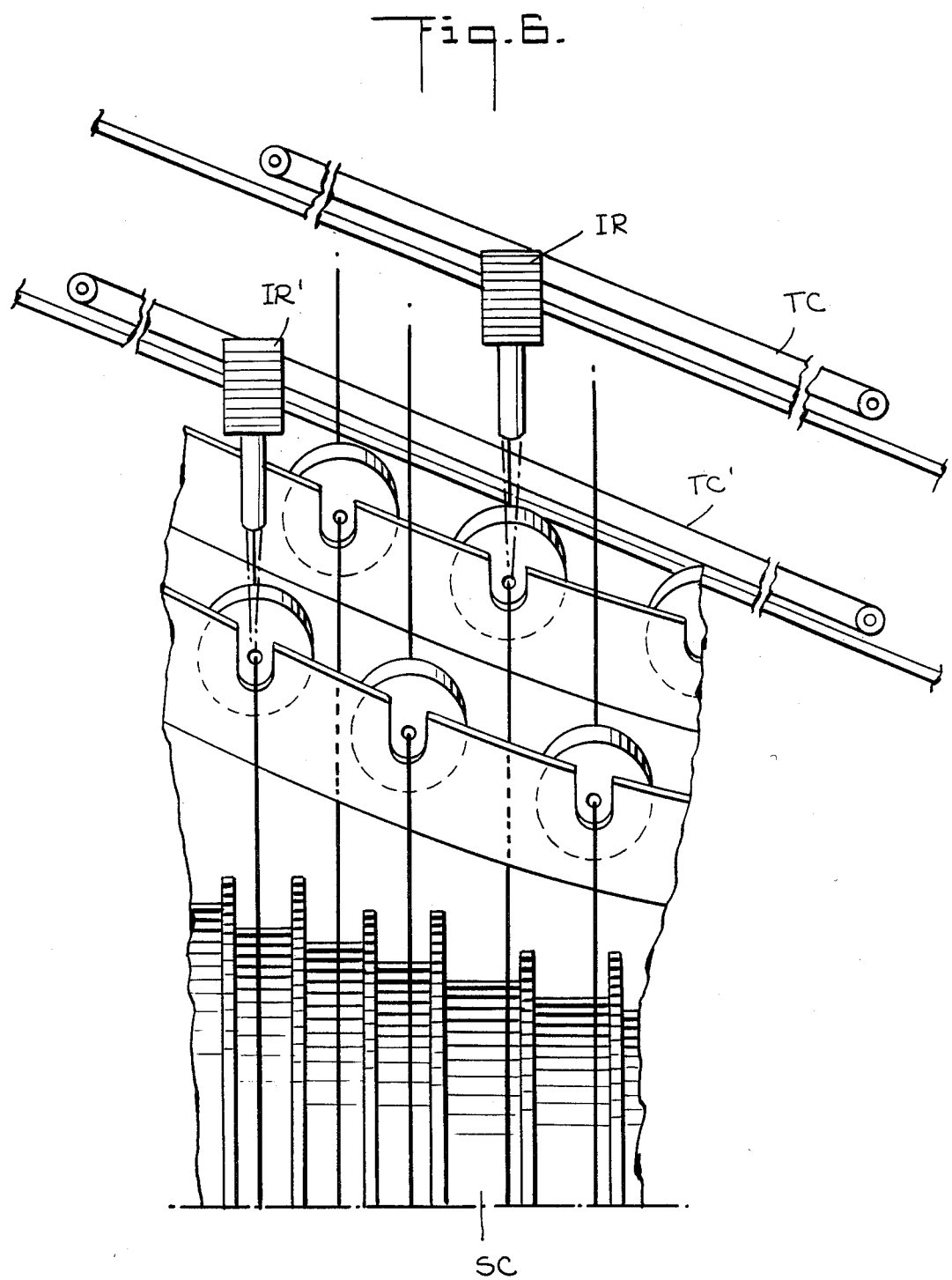

Specific examples of the invention are described below with the aid of the accompanying drawings in which:

FIG. 1 by a schematic top view shows the basic components of a continuous wire-drawing machine required to illustrate the principles of the invention;

FIG. 2 in cross-section shows how a non-contact infrared sensor can be used at each of the dies;

FIG. 3 in cross-section shows how a die may be made with a transverse sighting hole through which the sensor can aim directly at the wire actually within the bearing zone of the die;

FIG. 4, also in cross-section, shows how with the hole through the die, a sensor of the eroding thermocouple contact type can be pressed on the wire in the bearing zone of the die;

FIG. 5 schematically shows by a perspective view one of the blocks shown by FIG. 1 with two of its dies represented, sensing being done by non-contact infrared sensors and a computer controlling the speeds of the various drawing blocks of the continuous wire-drawing machine of FIG. 1; and FIG. 6 in perspective view shows the application of the principles of the invention to a continuous wire-drawing machine using a block of the step cone type.

In the above, FIG. 1 shows only four of the rotating vertical blocks 1 through 4 of the continuous wire-drawing machine. Wire W is drawn by the block 1 through a wire-drawing die 5, the block 2 next draws the wire through the next die 6 and so on until the wire is continuously drawn through the balance of the dies 7 through 9. The block drawing the wire through the die 9 is not shown. Conventionally there may be seven of the dies and their drawing blocks. The blocks are individually driven by controllable variable speed motors 1' through 4'. In FIG. 1 wire travels from right to left, starting with a supply source and ending with a storing arrangement for the drawn wire, neither being shown.

In FIG. 2 the die 6, for example, is shown with its die hole having a bearing zone 6a which determines the size to which the wire is drawn by that die. The other dies have corresponding zones, the dies from 5 to 9 having successively smaller bearing zones. The wire gets progressively longer as it travels from one die to another and this difference is taken up by the motors 1' through 4' being run progressively faster, under the control of the conventional wire-drawing machine controller.

Because completely precise control is impractical, although not shown in FIG. 1, each block is provided with a conventional dancer roll DR forming a loop in the wire span between the guide wheels. The dancer roll is mounted by an arm which is consequently deflected as the wire loop tension increases or decreases, the displacement action providing precise control of the block motors.

Returning to FIG. 1, the wire W, lubricated with wire-drawing lubricant before entering each die, heats unpredictably as it passes to and through the bearing zones of the various dies. The wire temperature in the bearing zone may be an overheated temperature in one die although at safely tolerable temperatures in the other dies. It has been believed that the only commercially practical way to run a wire-drawing machine is at such a low wire-drawing speed that the wire in all of the dies is at such low temperatures as to eliminate any possibility that one die running hotter than the rest could cause trouble.

In accord with the present invention FIGS. 1 and 2 show how commercially available infrared sensors 10 through 13 can be provided, each sensor being aimed and focused so as to read the wire temperature off of a spot as close as possible to the die's bearing zone in each instance. Sensors of this type are also called infrared detector heads, and are shown as each being connected with its own read-out instrument 10' through 13' which can advantageously be of the peak and hold type. They are shown entirely schematically in FIG. 1.

Possibly better read-out accuracy can be obtained if as shown by FIG. 3 each die is provided with a traverse hole TR which permits the sensor to be focused on the wire precisely within the bearing zone of the die. The die 5 is shown with this arrangement but the rest of the dies could use the same system. The top of the hole is shown as enclosed by a small dome D having a hole through which the sensor looks, and kept clear by a feed of pressurized air A. An alternative is shown by FIG. 4 where the hole TR is used for the installation of an eroding type thermocouple, permitting direct thermocouple contact with the wire in the bearing zone of the die. This system also could be used for all of the dies.

With the conventional wire-drawing machine modified or instrumented as described above, the wire-drawing speeds through the succession of dies can be controlled as usual but with the important exception that the wire drawing speed can be increased gradually up to a point where the read-out from the sensor of the hottest die makes its condition apparent. Until this condition is observed as a positive limitation of faster drawing speeds, the drawing speed can be increased with confidence above the much lower speed commercially indicated heretofore.

With this invention it does not matter which of the various dies begins to peak dangerously in temperature.

Some wire-drawing machines use a single wire-drawing block of the step-cone construction schematically shown as SC in FIG. 6. The succession of dies are mounted in a different arrangement than before but so that the same action results, the wire being first drawn by the smallest cone step through the first die and then progressively by the increasingly larger cone steps through the various dies.

In the above machine the wire via suitable wire guide rollers (not shown) loops back and forth while going through the dies, providing substantially parallel wire spans.

In the above case it is possible to mount only two sensors IR and IR' each on its own oscillating traversing drive TC and TC' so that the sensors continuously sweep or traverse back and forth so as to pick up the temperatures of the exiting wire at each bank of dies conventionally used by this type of wire-drawing machine. The details of the traversing system are not shown because they may follow conventional machine tool designing. The idea is to provide the action clearly shown by FIG. 1 in the case of the step-cone type of machine.

In either case, as shown by FIG. 5, the various sensors can feed their information to a computer 11 which controls the various block motors so as to hold the wire-drawing speed just below the overheated temperature condition as to any one of the wire-drawing dies showing a temperature peak.

What is claimed is:

1. A continuous wire-drawing method comprising lubricating the wire with a wire drawing lubricant, drawing the wire continuously through a succession of wire drawing dies having successively smaller bearing zones in which at an overheated temperature of the wire the wire or the die is damaged, while the wire is drawing continuously through the succession of wire drawing dies and at each and every die continuously individually measuring the wire temperature of the wire as close as possible to the die's bearing zone, and adjusting the drawing speed of the wire so that the highest temperature measured by any one of the dies is just below said overheated temperature.

2. The method of claim 1 in which the individual measuring is of the wire while it is in the die's bearing zone.

3. The method of clam 1 in which said individual measuring is by sensing the infrared radiation from the wire without contacting the wire.

4. The method of claim 1 in which said individual measuring is by an eroding type thermocouple contact the wire.

5. A continuous wire-drawing machine comprising a succession of wire drawing dies having successively smaller bearing zones, controllable means for drawing a wire continuously through the bearing zones of said dies, and measuring means for measuring the temperature of the wire at each die as close as possible to its bearing zone while the wire is drawing continuously through the succession of wire drawing dies and at each and every die continuously.

6. The machine of claim 5 in which said measuring means comprises at least one infrared sensor free from contact with the wire.

7. The machine of claim 5 in which at each die said measuring means comprises an eroding type thermocouple in contact with the wire.

8. The machine of claim 5 in which each die has a transverse hole exposing the wire in the die's bearing zone and the measuring means operates through the hole.

9. The machine of claim 5 in which said measuring means provide outputs fed to a computer means for controlling said controllable means so as to draw the wire at the maximum speed which does not cause overheating at any one of the dies.

* * * * *